(12) United States Patent
Giroir et al.

(10) Patent No.: US 7,356,598 B1
(45) Date of Patent: Apr. 8, 2008

(54) SYSTEM USING IP TRANSMISSION PRIORITY FOR IMPROVING OVERALL NETWORK RESPONSE TIME IN TELNET 3270 SESSIONS

(75) Inventors: Didier Giroir, Cagnes sur Mer (FR); Jean Lorrain, Vence (FR)

(73) Assignee: International Business Machines Corporation, Armonk, NY (US)

( * ) Notice: Subject to any disclaimer, the term of this patent is extended or adjusted under 35 U.S.C. 154(b) by 592 days.

(21) Appl. No.: 09/546,802

(22) Filed: Apr. 11, 2000

(30) Foreign Application Priority Data

Apr. 12, 1999 (EP) .................................. 99480021

(51) Int. Cl.
*G06F 15/16* (2006.01)
(52) U.S. Cl. ...................................... 709/228; 709/227
(58) Field of Classification Search ................ 709/228, 709/227, 234, 224, 223, 237, 230, 206, 207; 370/389, 252, 235, 236; 710/20
See application file for complete search history.

(56) References Cited

U.S. PATENT DOCUMENTS

| | | | | |
|---|---|---|---|---|
| 5,426,640 A | * | 6/1995 | Hluchyj et al. | 370/235 |
| 5,790,522 A | * | 8/1998 | Fichou et al. | 370/236 |
| 5,909,594 A | * | 6/1999 | Ross et al. | 710/20 |
| 5,987,518 A | * | 11/1999 | Gotwald | 709/230 |
| 6,023,456 A | * | 2/2000 | Chapman et al. | 370/252 |
| 6,049,833 A | * | 4/2000 | Chan et al. | 709/237 |
| 6,377,978 B1 | * | 4/2002 | Nguyen | 709/206 |
| 6,412,000 B1 | * | 6/2002 | Riddle et al. | 709/224 |
| 6,463,462 B1 | * | 10/2002 | Smith et al. | 709/206 |
| 6,466,976 B1 | * | 10/2002 | Alles et al. | 709/224 |
| 6,473,793 B1 | * | 10/2002 | Dillon et al. | 709/223 |
| 6,570,876 B1 | * | 5/2003 | Aimoto | 370/389 |

FOREIGN PATENT DOCUMENTS

| | | |
|---|---|---|
| JP | 06-232904 | 8/1994 |
| JP | 07-135512 | 5/1995 |
| JP | 11-032078 | 2/1999 |
| WO | WO 97/36405 | 2/1997 |

OTHER PUBLICATIONS

Robert Bosch GmbH, "CAN Specification, Version 2.0", http://www.tno.nl/m3s/ftp/doc/can.pdf; 1991.
Hopke, Philip K.: "How to Start Surfing the Internet" Chemometrics and Intelligent Laboratory Systems, vol. 30, No. 1, Nov. 1995, pp. 1-9, XP004037873, ISSN: 0169-7439, *p. 2, right-hand column, line 28—p. 3, left-handed column, line 11*.

(Continued)

*Primary Examiner*—Le Luu
(74) *Attorney, Agent, or Firm*—William H. Steinberg; Greenblum & Bernstein, P.L.C.

(57) ABSTRACT

Method in a telnet client for transmitting in a session, file traffic to an application through a telnet server in an Internet protocol (IP) network. The method includes assigning by the telnet client an IP transmission priority to file traffic different from the IP transmission priority used for interactive traffic and transmitting the file traffic to the telnet server using said assigned IP transmission priority.

16 Claims, 3 Drawing Sheets

OTHER PUBLICATIONS

"Type of Service in the Internet Protocol Suite", Request for Comment 1349, 'Online!, Jul. 1992, XP002116303 Retrieved from the Internet:: <URL:http//ww.faqs.org/rfcs/rfc2349.html>' retrieved on Sep. 23, 1999! * p. 2, line 16—p. 6, line 8 *, * p. 10, line 33—p. 11, line 2 *.

Bruno. L.":Lasting Legacy: Browsing Big Iron on the Web" Data Communications, vol. 25, No. 15, Nov. 1, 1996, pp. 110-112, 116-11, XP000639963, ISSN: 0363-6399 p. 113, left-hand column, line 1-19 *, p. 115, left-hand column, line 1—right-hand column, line 20 * *figure 1 *.

* cited by examiner

SYSTEM USING IP TRANSMISSION PRIORITY FOR IMPROVING OVERALL NETWORK RESPONSE TIME IN TELNET 3270 SESSIONS

TECHNICAL FIELD OF THE INVENTION

The present invention relates to digital communication networks, more particularly to a method and system in an SNA-IP environment for improving overall IP network response time during the exchange of files between Telnet 3270 Clients and SNA Hosts accessed through Telnet 3270 Servers.

BACKGROUND ART

Every day, for all sorts of reasons, more and more companies are focusing on the consolidation onto a single protocol network of the multiple specialized networks they directly operate or lease from service providers. These multiple specialized networks are based on diverse networking technologies such as Systems Network Architecture (SNA), Internet Protocol (IP) or Internetwork Packet Exchange (IPX). These companies are making this consolidation one of their top priorities, they are almost exclusively selecting IP (the Internet Protocol) as their protocol of choice. However, for the overwhelming majority of these companies that are using SNA protocols and applications, there still is and will be for the many years to come, a major requirement in this changing environment. The requirement is for the employees of these companies to keep the capability they always had to have access to the huge amount of existing corporate data residing in traditional mainframes and accessible through SNA applications.

In an IP environment, a widely used technique for the transport of SNA information across an IP network is the use of Telnet technologies (TN3270). This technique for SNA "green screen" workstation users is a Client/Server approach. "Host On Demand" from IBM or "WebClient" from CISCO are examples of Client software implementations. Network Utility from IBM or CISCO router's offerings are typical Server implementations (hardware and software). The "Client" piece usually runs within the customer's workstation while the "Server" piece is usually placed in front of the customer's Data Center mainframes (or sometimes directly within the mainframe itself) or within the customer's branch offices. As illustrated in FIG. 3, IP protocols are used between the Server and the Clients, while traditional SNA protocols are used between the Server and the target Applications.

Different kinds of sessions are shown in FIG. 3. An SNA session is a session between an SNA Logical Unit (LU) in the mainframe and the Logical Unit representing the terminal (the TN3270 Client) within the Server. A screen session is a session between the TN3270 Client and the mainframe application. A TCP session is a session between the TN3270 Client and the TN3270 Server.

More information concerning the Internet Protocols, Telnet, TN3270 and Network Utility can be found in the following publications incorporated herewith by reference:

"Systems Network Architecture Technical Overview", Fifth Edition (January 1994), GC30-3073-04.

"IBM 2216/Network Utility Host Channel Connection", Erol Lengerli, Jacinta Carbonell, Thomas Grueter; IBM International Technical Support Organization, January 1999, SG24-5303-00.

"IBM Network Utility Description and Configuration Scenarios", Tim Kearby, Peter Gayek, Gallus Schlegel, Imre Szabo, Zhi-Yong Zhang; IBM International Technical Support Organization, January 1999, SG24-5289-00.

"TCP/IP Tutorial and Technical Overview", M. Murhammer, O. Atakan, S. Bretz, L. Pugh, K. Suzuki, D. Wood; IBM International Technical Support Organization, Sixth Edition (October 1998), GG24-3376-05.

"Internetworking with TCP/IP—Volume I—Principles, Protocols, and Architecture" Douglas E. Comer, Second Edition, Prentice Hall 1991.

Request For Comments (RFCs) from the Internet Engineering Task Force (IETF):

RFC 1576: TN3270 Current Practices,
RFC 1646: TN3270 Extensions for LU name and Printer Selection,
RFC 1647: TN3270 Enhancements,
RFC 2355: TN3270 Enhancements,
RFC 2474: Definition of the Differentiated Service Filed (DS Field) in the IPv4 and IPv6 Headers,
RFC 2475: An Architecture for Differentiated Services,
RFC 1349: Type of Service in the Internet Protocol Suite.

Telnet 3270 protocols specify that Clients are connected to the hosts via TN3270 Servers. Traditionally, in SNA environments, the data traffic related to screen interaction between a terminal and a host application is characterized as interactive traffic, while the data traffic related to the transfer of files is characterized as batch traffic. Telnet 3270 and SNA Protocols offer to TN3270 Clients the capability to download within the local workstation where the Client operates, files from the host(s) they are connected to. Similarly, it is possible for a Client to upload files from the local workstation to SNA Hosts the Client is in session with.

When a TN3270 Client exchanges files with an SNA Host across a Telnet Server, the packets of information related to the file being exchanged are sent between the Client and its Server using the same sessions (TCP, Screen and SNA sessions as illustrated in FIG. 3) than those used for screen related interactions. This means that data packets related to the transfer of files are using the same priority than the priority used for the interactive traffic due to screen related interactions. This mode of operation violates SNA fundamental rules associated with SNA Class Of Service (COS) and Transmission Priority (TP) within SNA networks. These rules assume that interactive traffic (such as screen related interactions) gets a better treatment within the network than lower priority traffic such as batch traffic (such as file transfer related traffic).

Transfer of large files between Clients and their Servers generate a huge amount of data packets that should not flow on the same priority as the interactive, screen related traffic. As a differentiation is not made, overall response time is severely impacted as now, the true interactive traffic but also the non-SNA data traffic will be penalized by a flooding of data packets related to the exchange of files across the network. Exchanging files consumes bandwidth and processing resources within the network. In fact, from an SNA standpoint, the packets related to the exchange of files between a Client and its Server should have a lower priority than the real interactive traffic allowing the higher priority traffic to get a better service than any other low priority traffic.

FIG. 1 provides a schematic view of two traffic sources (TN3270 Clients) connected to a destination (a TN3270 Server) across an IP Network. From an IP network standpoint, as there is no differentiation between the data traffic due to screen related interactions and the data traffic related to file transfer, all SNA packets are treated the same. The network may be represented as a single queue, with a first come first serve quality of service. In summary, SNA traffic for interactive traffic (screen related interactions) is impacted by the transfer of files. Similarly, non-SNA traffic (such as pure IP data traffic), usually flowing on a lower priority than SNA traffic is also impacted by the potential network flooding due to data packets exchanged across the network during file transfer.

The present invention proposes a solution within the IP network, to get around this response time problem.

It is an object of the present invention to allow TN3270 Clients to dynamically specify a lower IP priority for the traffic related to the exchange of files (batch traffic), than the priority associated to the traffic due to screen related interactions (interactive traffic).

It is a further object of the present invention to allow a TN3270 Server to use the same priority as the priority used by the Client when exchanging information with the Client.

SUMMARY OF THE INVENTION

The present invention discloses a method and system to provide the Client with the capability, when exchanging a file with an SNA Host over a TCP session, to dynamically change (i.e downgrade) the IP priority associated to all data packets flowing to the TN3270 Server over the TCP session, during the whole duration of the file transfer.

The associated Server, on receipt of a data packet from the client (due to screen related interactions or to file transfers), memorizes the associated priority used within the TCP session and uses this priority over all packets that it sends back to the client over this TCP session. This allows network implementation to give higher priority treatment to the data packets due to screen related interactions (interactive traffic) over data packets related to file transfer (batch traffic).

The priority used by data packets related to file transfer is customizable, to give maximum freedom to the network designer. For example, SNA true interactive traffic (due to screen related interactions) could flow on the highest priority, pure IP traffic could flow on any of the possible medium priorities and data packet due to file transfer could use the lowest priority within the network.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

PREFERRED EMBODIMENT OF THE INVENTION

Figure 1:
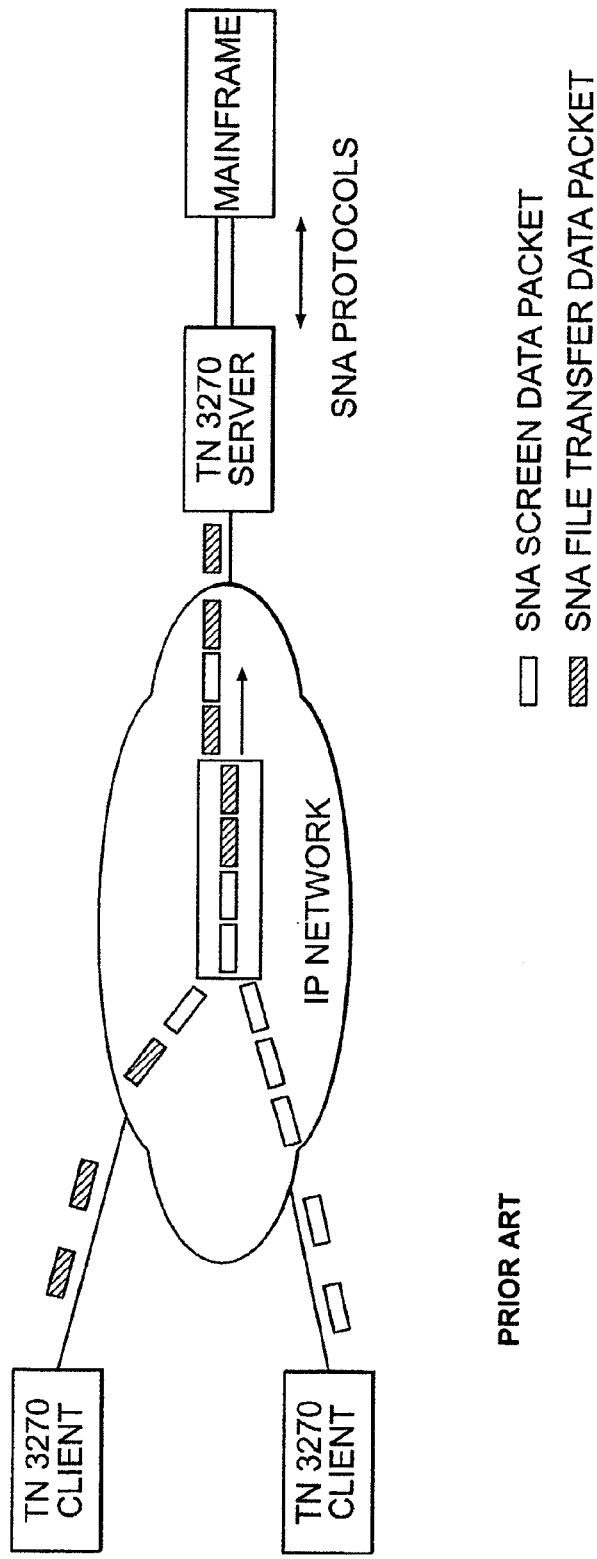
FIG. 1 is prior art which shows how packets from two different sources are processed across an IP network, when file transfer and screen related interactions both use the same IP priority.

To remain competitive, network users are extending their traditional internal SNA and IP networks outward to business partners, dealers, suppliers, and customers. In this expanding environment, users are also searching for ways to save money and provide connectivity between their mix of SNA and TCP/IP server applications and their TCP/IP and SNA desktop client population.

Many companies today are considering the consolidation of their WAN traffic onto a single IP-only backbone. At the same time, other companies are simplifying their workstation configurations and attempting to run only the TCP/IP protocol stack at the desktop. However, most of these companies still require access to SNA applications hosts.

TN3270 meets these extension and consolidation requirements by allowing the end user to run IP from the desktop over the network and attach to his SNA host through a TN3270 server. The clients connect to the server using TCP connections. The server provides a gateway function for the downstream TN3270 clients by mapping the client sessions to SNA-dependent LU-LU sessions that the server maintains with the SNA host. The TN3270 server handles the conversion between the TN3270 data stream and an SNA 3270 data stream.

As mentioned above, the path from a TN3270 client to the SNA host consists of a TCP connection over IP from the client to the server and an SNA LU-LU session from the server to the host. Connecting to a host for establishing an LU-LU session can be accomplished using a traditional subarea connection or using an APPN connection.

To deploy a TN3270 solution, TN3270 client software is installed on desktop workstations and TN3270 server software is installed in one of several places discussed below. Client software is available from IBM and many other vendors, and runs on top of the TCP/IP stack in the workstation. A given client product provides one of two possible levels of standards support. The base TN3270 clients conform to RFC 1576 (TN3270 Current Practices) and/or RFC 1646 (TN3270 Extensions for LU name and Printer Selection). The TN3270 E clients conform to RFC 1647 (TN3270 Enhancements), and RFC 2355 (TN3270 Enhancements). A server implementation that can support TN3270 E clients is called a TN3270 E server. The TN3270 server function can be placed in a variety of products and positions within a network, including either in the SNA host itself or in a router in front of the data host or within the network or in a specialized box within the network;

In SNA, Transmission Priority and Classes Of Service (COS) enable equal service to be provided to sessions of equal priority, or preference given to sessions of higher priority. The specified COS for a session to be established is used to select the best route across the network to satisfy the desired characteristics for the session, and defines the Transmission Priority that the SNA packets related to this session will use when flowing across the network. In an SNA network, different Classes Of Service can be specified, based upon the needs of the end users in the network. End users typically require sessions with widely varying data transmission requirements. A range of Classes Of Service can therefore be provided to accommodate their session requirements. For example, one can cite four Classes Of Service which can exist in a network. A first could be a Class Of Service that provides response times suitable for high priority interactive sessions. A second could be a Class Of Service that provides response times suitable for low priority interactive sessions. A third could be a Class Of Service suitable for Batch processing. A fourth Class, Of Service could be a class suitable for high security transmissions.

In support of the IP transmission priority there is an existing Service Type byte in the IP Header. The Service Type is an indication of the quality of service requested for the IP datagram and comprises the Precedence, the TOS and the MBZ fields. The Precedence is a measure of the nature and priority of the IP datagram; the following values are defined (Routine, Priority, Immediate, Flash, Flash override, Critical, Internetwork control, Network control). The Type Of Service (TOS) specifies the type of service value (Minimize delay, Maximize throughput, Maximize reliability, Minimize monetary cost, Normal service). The MBZ is reserved for future use.

The Differentiated Services (DS) concept is today under development at the Internet Engineering Task Force (IETF) DS working group. The goal of the DS development is to get a possibility to provide differentiated classes of service for Internet traffic, to support various types of applications, and specific business requirements. The Differentiated Services (DS) offers predictable performance (delay, throughput, packet loss, etc.) for a given load at a given time. The DS byte uses the space of the TOS octet in the IP header. All network traffic receives a service that depends on the traffic class that is specified in the DS byte.

The preferred embodiment of the invention is implemented in a Client workstation and in the associated Server. The Client has established a TCP session to transport the TELNET traffic. The data packets exchanged over the TCP session comprises either file transfer or screen related interactions which require a highest priority. Without the implementation of the preferred embodiment, the data traffic over the TCP session uses one IP priority, the priority which has been associated to this TCP session. With the implementation of the preferred embodiment, the client from his workstation, when exchanging a file with a TN3270 SNA host will dynamically downgrade the IP priority of the corresponding IP traffic during the whole duration of the file transfer. The associated server, on receipt of a data packet from the client memorizes the associated priority and uses this priority over all packets that it sends back to the client. This allows the client to give higher priority treatment to the data packets due to screen related interactions (interactive traffic) over data packets related to file transfer (batch traffic such as file transfer) this priority being reflected by the IP priority. The priority is customizable, to give maximum freedom to the network designer. For example, SNA true interactive traffic (due to screen related interactions) could flow on the highest priority, pure IP traffic could flow on any of the possible medium priorities and data packet due to file transfer could use the lowest priority within the network.

Figure 2A:
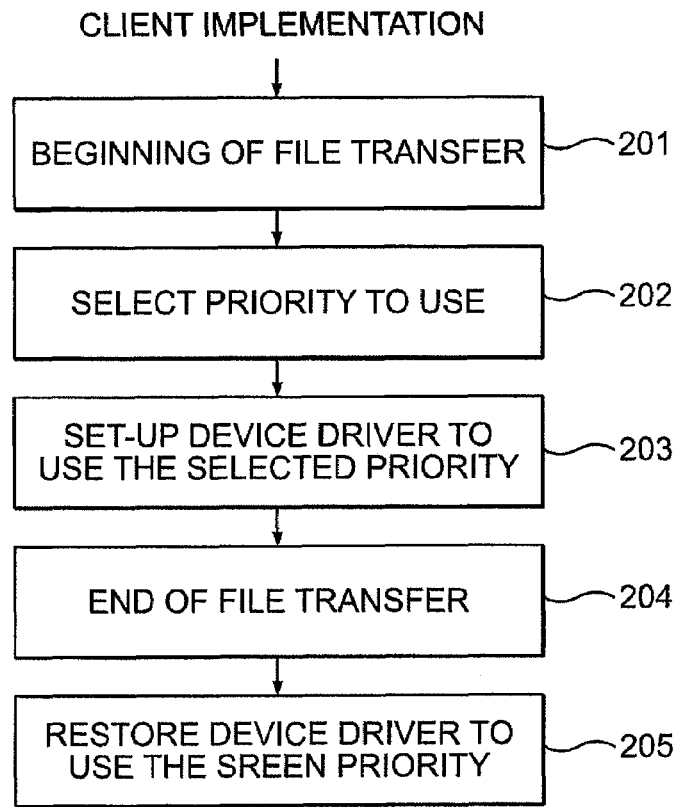
FIG. 2a shows various steps performed within the Client according to the present invention.
Figure 2B:
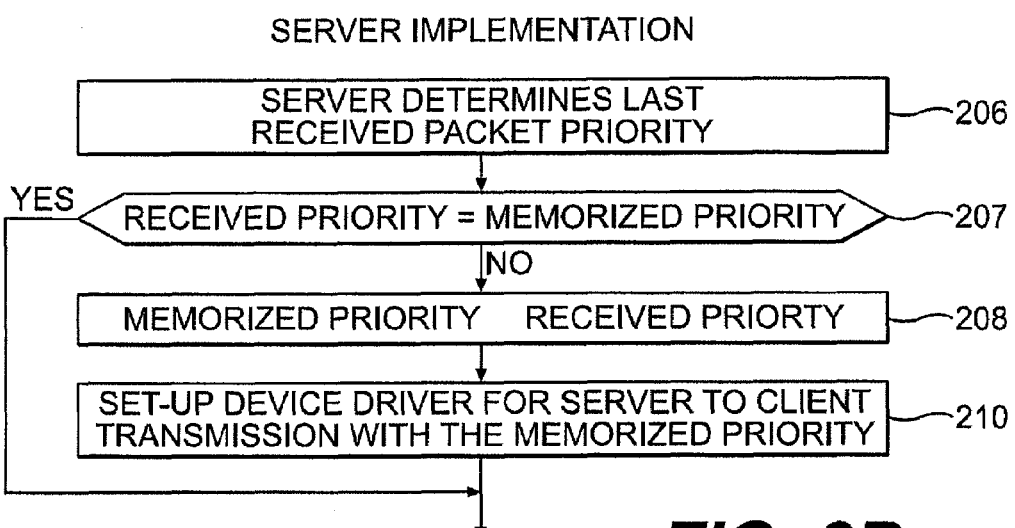
FIG. 2b shows various steps performed within the Server according to the present invention.
Figure 3:
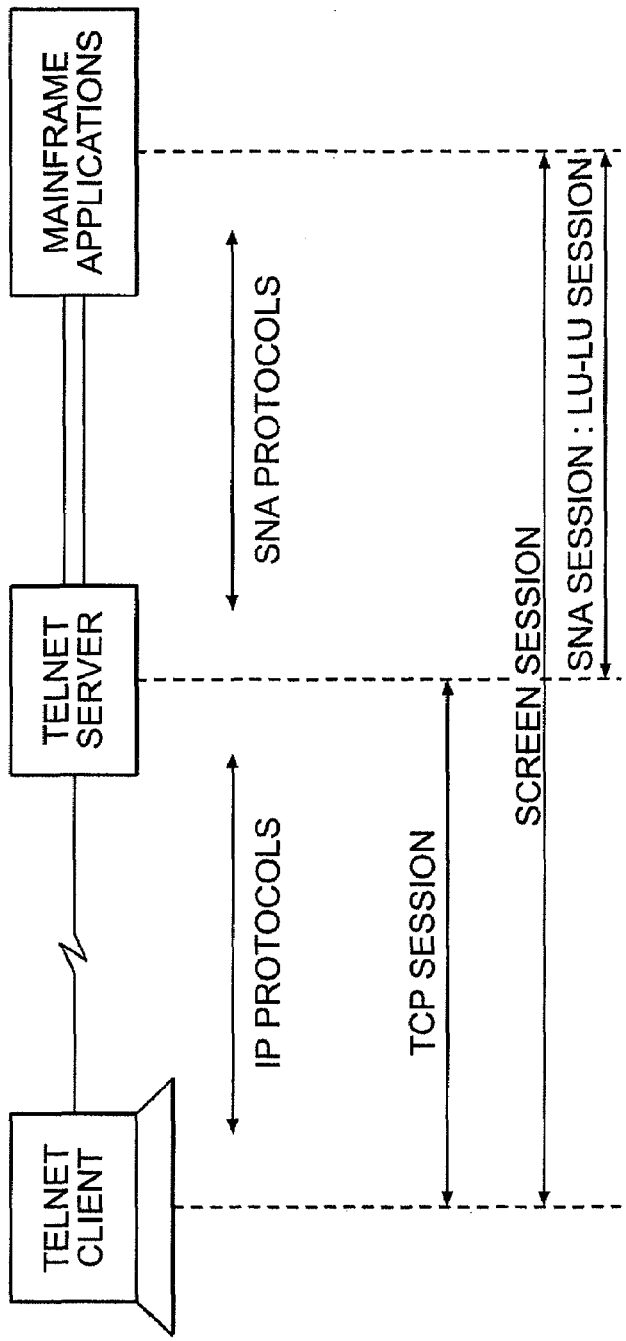
FIG. 3 is prior art which shows an access to SNA Applications in a Telnet 3270 Environment.

FIG. 2a and FIG. 2b illustrate the preferred embodiment respectively implemented in the client workstation or in the server.

The steps of the method of the preferred embodiment as implemented in the client workstation is illustrated in FIG. 2a. In the first step (201) the Client detects that a file transfer takes place between the Client and the Server (file transfer is always performed as a result of an initiative from the Client). This file transfer takes place within a same TCP session which has already been established and that also carries data packets for screen related interactions. The Client decides which priority has to be used and selects it (202). In the preferred embodiment, the priority used for screen related data transfers is reduced (the amount of reduction is customizable). This provides an IP priority lower than the one used for true interactive traffic (now used only for screen related interactions). In step 203 the Client sets up a local network Device Driver for the IP protocol stack in the workstation, to use the selected IP packet priority during the whole duration of the data transfers related to the file exchange. In step 204 the Client detects the termination of the file transfer, he restores the network Device Driver (205) to use the screen related data transfer priority, this is done to use the right priority associated to the transfer of data packet related to the traffic due to screen related interactions.

The details related to Device Driver manipulation will not be described further as this is specific to particular workstation hardware and software combinations. A person skilled in the state of the art can easily work out the required details of these specifics.

The preferred embodiment of the invention implemented in the server is described in FIG. 2b. For each TCP session between a Client and a Server, there is an associated priority to be memorized by the Server. At Server initialization time, the memorized priority is initialized with an arbitrary value (such as the IP priority to be used for screen related interactions). The Server determines the priority of the last packet received from the Client (step 206). The Server compares the last packet priority previously determined with the memorized priority for this TCP session (test 207). If they differ (branch No to test 207), the memorized priority is set (208) to the last packet received priority, and the Server sets up a local network Device Driver for the IP protocol stack in the workstation (209), to use the memorized IP packet priority for all packets sent to the Client over this TCP session. If priorities are the same (answer Yes to test 207), the packet priority is not changed for this TCP session.

The manipulation of the priorities for the IP packets is done in accordance with RFC 1349, 2474 and 2475, or any other proprietary scheme.

While the invention has been particularly shown and described with reference to a preferred embodiment, it will be understood that various changes in form and detail may be made therein without departing from the spirit, and scope of the invention.

What is claimed is:

1. A method in a telnet client for transmitting in a session, file traffic to an application through a telnet server in an Internet protocol (IP) network, said method comprising the steps of:
   assigning by the telnet client an IP transmission priority to file traffic different from the IP transmission priority used for interactive traffic; and
   transmitting the file traffic to the telnet server using said assigned IP transmission priority.

2. The method according claim 1 wherein:
   the IP transmission priority used for file traffic is lower than the IP transmission traffic used for transmitting interactive traffic.

3. The method according to claim 2 wherein it comprises the further step of:
   detecting the file traffic to be transmitted to the application through the telnet server.

4. The method according to claim 3 wherein it comprises the further step of:
   setting up a device driver for transmitting the file traffic with the assigned file traffic IP transmission priority.

5. The method according to claim 4 wherein it comprises the further steps of:
   detecting the end of the file traffic; and
   restoring the device driver with the interactive traffic IP transmission priority.

6. The method according to claim 5 wherein:
   the telnet client is a telnet 3270 client; and
   the telnet server is a telnet 3270 server.

7. The method according to claim 6 wherein the application is a systems network architecture (SNA) application.

8. The method according to claim 7 wherein:
   the file traffic between the telnet client and the telnet server is transmitted on a Transmission Control Protocol (TCP) session; and
   the file traffic between the telnet server and the systems network architecture (SNA) application is transmitted on a systems network architecture (SNA) session.

9. The method according to claim 1, further comprising:
   establishing a TCP session to transport the file traffic;
   exchanging data packets over the TCP session comprises either the file traffic or interactive traffic; and
   dynamically downgrading the IP priority of the corresponding file traffic during a whole duration of a file transfer.

10. The method according to claim 1, further comprising:
    memorizing the IP transmission priority; and
    using the IP transmission priority over all packets that are sent back to the telnet client.

11. The method according to claim 10, further comprising:
    determining a priority of a last packet received from the telnet client;
    comparing the last packet priority previously determined with the memorized IP transmission priority; and
    if priority differs, the memorized IP transmission priority is set to the last packet received priority.

12. A method in a telnet server for transmitting in a session, traffic from an application to a telnet client in an Internet protocol (IP) network, said method comprising the steps of:
    detecting and memorizing the IP transmission priority associated to the traffic received from the telnet client; and
    transmitting traffic received from the application to the telnet client using the memorized IP transmission priority associated to the traffic previously received from the telnet client.

13. The method according to claim 12 wherein it comprises the further step of:
    setting up a device driver for transmitting the traffic with the IP transmission priority associated to the traffic previously received from the telnet client.

14. The method according to claim 13 wherein the telnet client is a telnet 3270 client; and the telnet server is a telnet 3270 server.

15. The method according to claim 14 wherein the application is a systems network architecture (SNA) application.

16. The method according to claim 15 wherein:
    the traffic between the telnet client and the telnet server is transmitted on a Transmission Control Protocol (TCP) session; and
    the traffic between the telnet server and the systems network architecture (SNA) application is transmitted on a systems network architecture (SNA) session.

* * * * *